US006384578B1

(12) United States Patent
Patino et al.

(10) Patent No.: US 6,384,578 B1
(45) Date of Patent: May 7, 2002

(54) METHOD FOR ESTIMATING THE USEFUL POWER REMAINING IN A BATTERY OF A WIRELESS COMMUNICATION DEVICE

(75) Inventors: Joseph Patino, Pembroke Pines; Alexander Rodriguez, Hialeah; Charles Cole, Plantation; William F. Pence, Jr., North Lauderdale, all of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/781,143

(22) Filed: Feb. 12, 2001

(51) Int. Cl.$^7$ ................................................ H02J 7/04
(52) U.S. Cl. ..................................................... 320/149
(58) Field of Search ................................ 320/132, 136; 324/427; 340/636

(56) References Cited

U.S. PATENT DOCUMENTS 5,155,428 A * 10/1992 Kang ........................ 320/136
6,023,150 A * 2/2000 Patino ....................... 320/132
6,191,558 B1 * 3/2000 Arai et al. .................. 320/132

* cited by examiner

Primary Examiner—Peter S. Wong
Assistant Examiner—Pia Tibbits
(74) Attorney, Agent, or Firm—Scott M. Garrett

(57) ABSTRACT

The minimum transmit battery voltage ($V_{tx\ min}$) of a radio operating in a TDMA mode of operation or the stand-by battery voltage ($V_{std-by}$) of the radio operating in a GSM mode of operation can be determined as a function of the combination of an in-slot transmit battery voltage ($V_{in-slot}$), an out-of-slot transmit battery voltage ($V_{out-slot}$), a stand-by compensation factor ($\Delta sb$), and a compensation factor (K). The stand-by compensation factor ($\Delta sb$) is related to a difference between the out-of-slot transmit battery voltage ($V_{out-slot}$) and a stand-by battery voltage ($V_{std-by}$). The compensation factor (K) has a first value for the TDMA mode of operation and a second value for the GSM mode of operation. Each value of compensation factor (K) is related to the manner in which the radio utilizes battery power during transmission in the TDMA or GSM modes of operation.

2 Claims, 3 Drawing Sheets

METHOD FOR ESTIMATING THE USEFUL POWER REMAINING IN A BATTERY OF A WIRELESS COMMUNICATION DEVICE

BACKGROUND OF THE INVENTION

1. Field of the Invention

The present invention relates generally to battery-operated wireless communication devices, such as radios, and in particular, to estimating the useful power remaining available in the batteries of such radios.

2. Background of the Invention

Batteries are utilized to power portable radios, such as two-way radios, cell phones, pagers, and the like. It is often necessary to estimate battery voltage during operation of the radio to ensure the radio has sufficient operating power and, more particularly, voltage for proper operation. In some radios, these estimates result in battery voltage levels, which are in turn translated into discrete sets of battery fuel levels which can be associated with fuel "bars" that are displayed on a visual display of the radio.

It is well-known in the art that the voltage of a battery "slumps" according to the load placed on it. Radios are typically not configured to detect a minimum transmit battery voltage ($V_{tx\ min}$) that corresponds to a maximum or peak current draw during in-slot transmission. However, radios are often able to detect an average in-slot transmit battery voltage ($V_{in\text{-}slot}$) and an average out-of-slot transmit battery voltage ($V_{out\text{-}slot}$). As used herein, $V_{in\text{-}slot}$ and $V_{out\text{-}slot}$ refer to slots or windows of time when the radio transmits data and stays the transmission of data during a transmission mode of operation, respectively. In prior art radios, $V_{tx\ min}$ is estimated by multiplying the difference between $V_{in\text{-}slot}$ and $V_{out\text{-}slot}$ by a constant compensation factor (K). The constant compensation factor K is determined empirically from bench measurement and then programmed as a fixed variable in the radio. A typical formula for use in calculating battery voltage levels in both stand-by and transmission modes is represented as follows:

$$V_{tx\ min} = (V_{out\text{-}slot}) - [(V_{out\text{-}slot}) - (V_{in\text{-}slot})] * K$$

where $V_{out\text{-}slot}$ is assumed to equal a stand-by battery voltage ($V_{std\text{-}by}$) and $V_{tx\ min}$ equals the minimum transmit battery voltage.

$V_{tx\ min}$ is then compared against a set of predetermined loaded voltage thresholds to determine the fuel "bars" to be displayed on the visual display of the radio and to estimate the useful power remaining in the battery.

There are two basic problems with the above-described approach. First, $V_{out\text{-}slot}$ is assumed to equal $V_{std\text{-}by}$. This assumption, however, is incorrect since the radio continues to draw power during the out-of-slot transmission mode that it would not draw when in stand-by mode. Specifically, the voltage of the battery while the radio is in stand-by mode will be greater than the voltage of the battery while the radio is in out-of-slot transmission mode. This difference causes the voltage threshold comparison for stand-by mode to need to be adjusted accordingly.

The second shortcoming with the prior art approach arises when $V_{tx\ min}$ is compared to the set of predetermined voltage thresholds which are determined based on the assumption that the radio is operating at substantially full transmission power. However, the more aggressively the radio reduces its transmission power, the more this comparison will be adversely affected. This is especially true when the radio is operating in a GSM mode of operation where the radio more aggressively reduces its transmission power output as a function of the strength of the signal received by the radio.

DETAILED DESCRIPTION OF THE PREFERRED EMBODIMENT

The present invention enables the power remaining in a battery of a radio to be more accurately measured. By virtue of this more accurate measurement, the fuel "bars" of a display of the radio can be more stably illuminated while avoiding inadvertent fluctuation of the fuel "bars" attendant with prior art methods of determining the power remaining in the battery.

Figure 1:
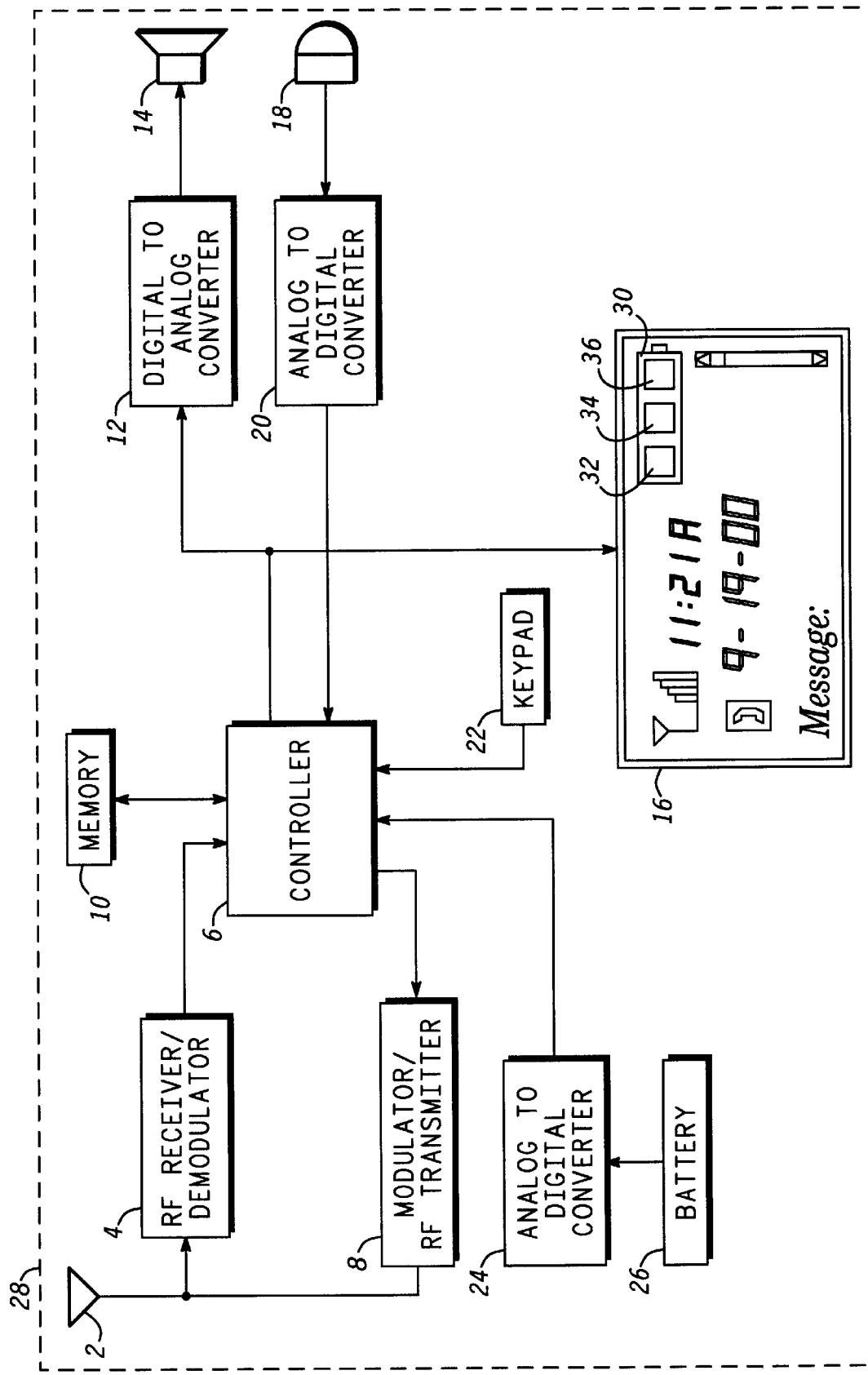
FIG. 1 is a block diagram of a radio, such as a cellular telephone.

With reference to FIG. 1, a radio 28, such as a cellular telephone, includes an antenna 2 for receiving and transmitting radio signals. An RE receiver/demodulator 4 processes the radio signals received by antenna 2 and demodulates therefrom voice and/or data signals. When radio 28 operates in a TDMA or a GSM mode of operation, the voice/data signals comprise quadrature data which is provided to a programmable digital controller 6, such as a microprocessor or digital signal processor. Controller 6 converts certain quadrature data into digital data for processing by a digital-to-analog (D/A) converter 12 into corresponding analog signals which are provided to a speaker 14 for conversion into audible sound. In addition, controller 6 converts certain other quadrature data into digital operational and/or call data which is provided to a display 16 for display thereon.

A microphone 18 converts audible sounds into analog electrical signals which are supplied to an analog-to-digital (A/D) converter 20 for conversion into digital data for processing by controller 6 into quadrature data which is supplied to a modulator/RF transmitter 8. Modulator/RF transmitter 8 processes the quadrature data into corresponding radio signals which are supplied to antenna 2 for transmission thereby. A keypad 22 connected to controller 6 enables a user to enter data, such as telephone numbers, into controller 6. An A/D converter 24 is connected between controller 6 and a battery 26 which is utilized to supply operating power to the elements associated with reference numbers 2–24 during operation of radio 28.

Display 16 includes, among other things, a battery indicator 30 having, for example, fuel "bars" 32, 34, and 36. In operation, controller 6 selectively illuminates fuel "bars" 32, 34, and/or 36 as a function of the power remaining in battery 26.

Figure 2:
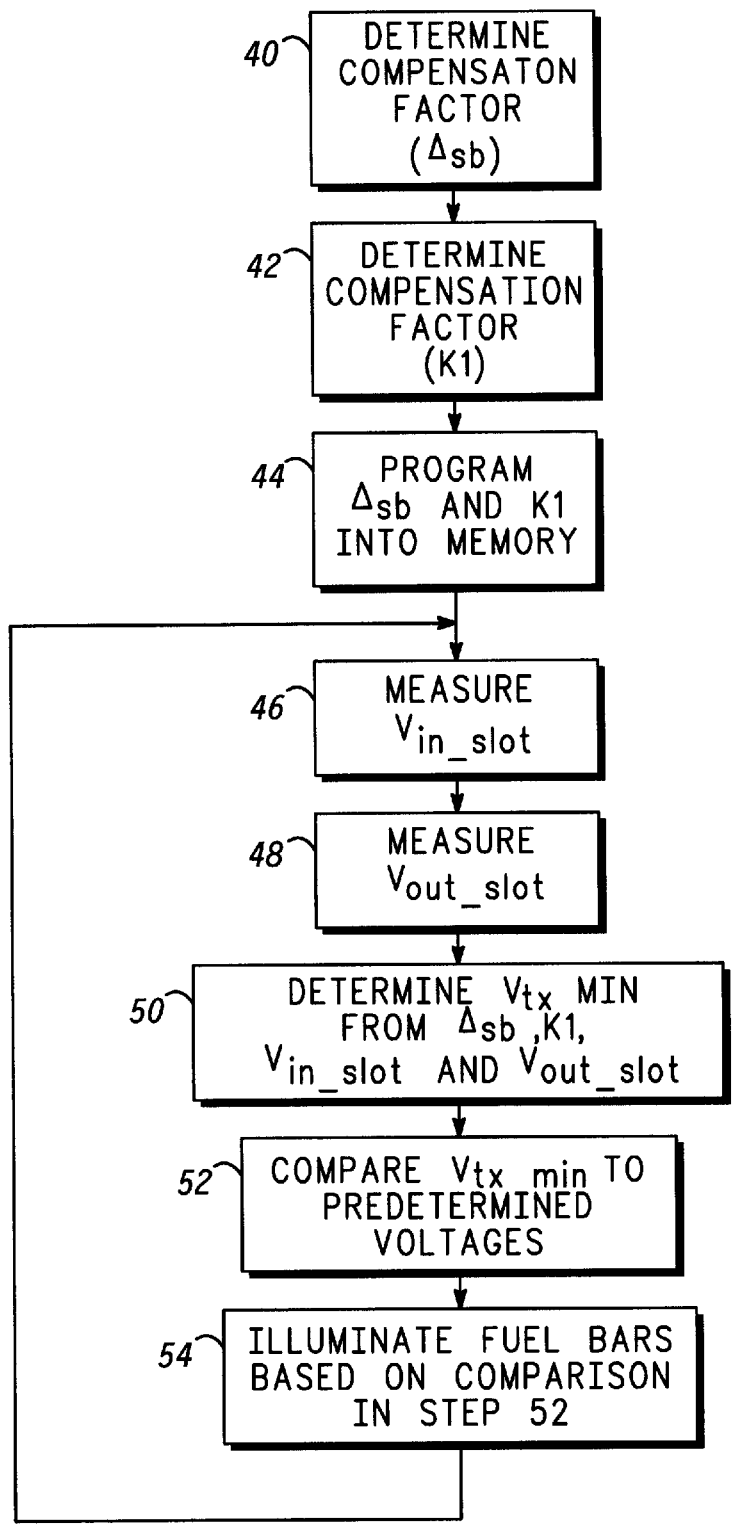
FIG. 2 is a flow chart of a method of estimating the charge in the battery of the radio shown in FIG. 1 operating in a TDMA mode of operation.
Figure 3:
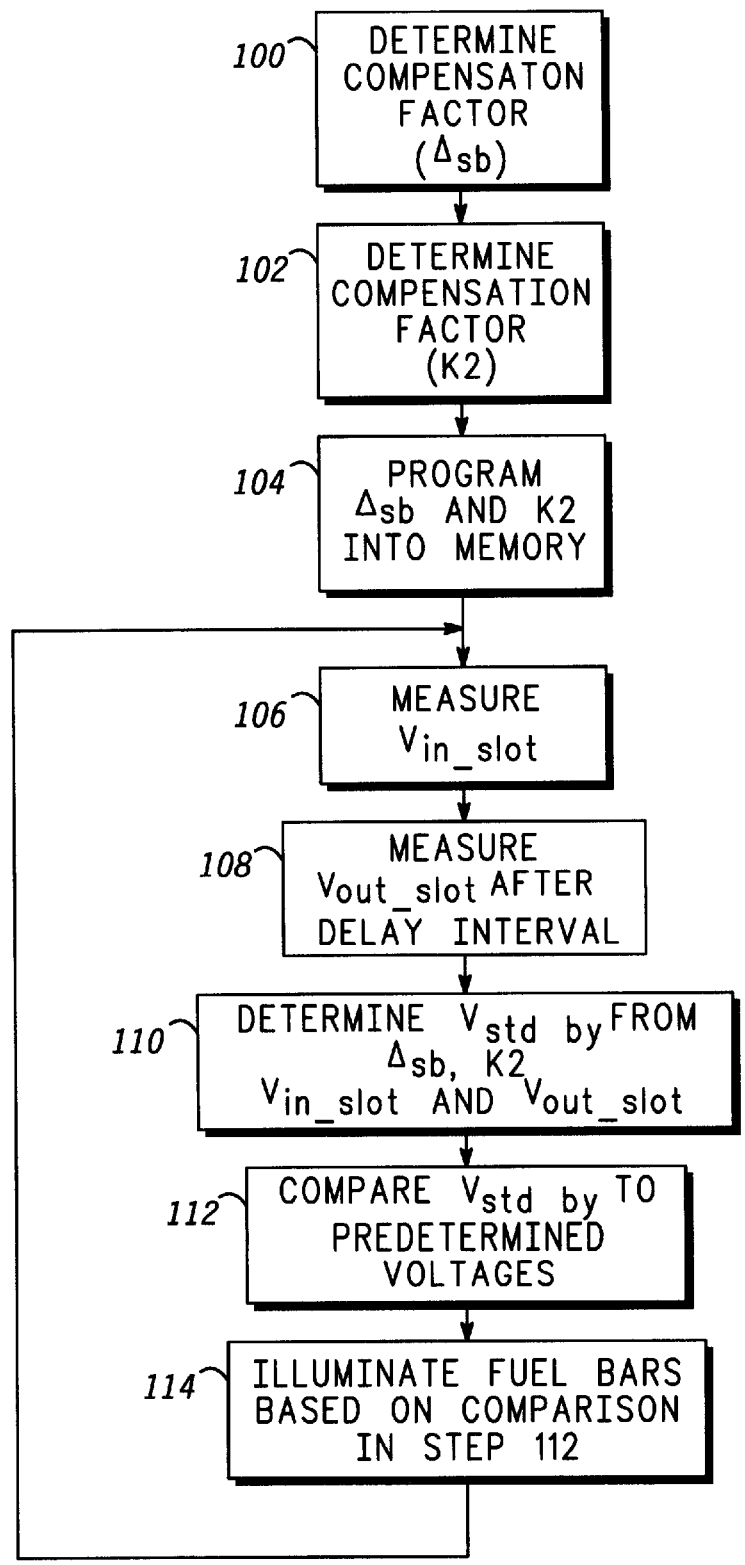
FIG. 3 is a flow chart of a method of estimating the charge in the battery of the radio shown in FIG. 1 operating in a GSM mode of operation.

A method of estimating the power remaining in battery 26 of radio 28 operating in a TDMA mode of operation is shown in the flow chart of FIG. 2. In the method, a stand-by voltage shift ($\Delta sb$) is empirically determined in step 40 for the difference between $V_{std\text{-}by}$ and $V_{out\text{-}slot}$ and in step 42, a compensation factor (K1) is empirically determined. The values of $\Delta sb$ and K1 are programmed into memory 10 of radio 28 in step 44. In step 46, controller 6 measures from battery 26 via A/D converter 24 a value of $V_{in\text{-}slot}$ during an in-slot transmission mode of radio 28. In step 48, controller 6 measures from battery 26 via A/D converter 24 a value of $V_{out\text{-}slot}$ during an out-of-slot transmission mode of radio 28. Next, in step 50, controller 6 determines the value of $V_{tx\ min}$ as a function of the combination of the values of $V_{in\text{-}slot}$, $V_{out\text{-}slot}$, $\Delta sb$, and K1. In step 52, controller 6 compares $V_{tx\ min}$ to one or more predetermined loaded voltage thresholds stored in memory 10 to estimate the power remaining in battery 26. In response to the comparison in step 52, controller 6, in step 54, selectively illuminates fuel "bars" 32, 34, and/or 36.

More specifically, in the TDMA mode of operation, $V_{tx\ min}$ is determined as follows:

$$V_{tx\ min}=(V_{std\text{-}by})-[(V_{std\text{-}by})-(V_{in\text{-}slot})]*K1 \qquad \text{EQ. 1}$$

As discussed above, however, $V_{std\text{-}by}$ cannot be accurately measured while in transmit. Thus, stand-by voltage shift $\Delta sb$ is combined with the value of $V_{out\text{-}slot}$ measured by controller 6 to obtain an estimate of the value of $V_{std\text{-}by}$ for the purpose of determining $V_{tx\ min}$. More specifically, $V_{std\text{-}by}$ is determined as follows:

$$V_{std\text{-}by}=V_{out\text{-}slot}+\Delta sb \qquad \text{EQ. 2}$$

Combining EQ. 1 and EQ. 2 yields the following:

$$V_{tx\ min}=(V_{out\text{-}slot})+(\Delta sb)-[(V_{out\text{-}slot})+(\Delta sb)-(V_{in\text{-}slot})]*K1 \qquad \text{EQ. 3}$$

It can be seen from EQ. 3 that using the value of $\Delta sb$ in combination with the values of $V_{in\text{-}slot}$, $V_{out\text{-}slot}$, and K1, $V_{tx\ min}$ can be accurately estimated. It has been determined that the value of K1 is typically between 1.2 and 1.4 and, preferably, between 1.25 and 1.3 depending on the transmit circuitry of radio 28.

The value of $V_{tx\ min}$ determined by controller 6 utilizing EQ. 3 more closely estimates the actual minimum transmit (or loaded) battery voltage during both stand-by mode and transmission mode for radio 28 operating in the TDMA mode of operation. This is because $V_{out\text{-}slot}$ is compensated by $\Delta sb$, which allows for better estimation of the actual stand-by battery voltage.

As discussed above, the value of $V_{tx\ min}$ is compared to a set of predetermined loaded voltage values stored in memory 10 to determine the power remaining in battery 26 of radio 28 operating in the TDMA mode of operation. Based on the results of the comparison, fuel "bars" 32, 34, and/or 36 are selectively illuminated on display 16. For example, if display 16 has fuel "bars" 32, 34, and 36, two predetermined voltages are stored in memory 10 of radio 28. The first predetermined voltage corresponds to a power remaining in battery 26 that is equal to up to one-third of its maximum useful power. The second predetermined voltage corresponds to a power remaining in battery 26 that is two-thirds of its maximum useful power. If the value of $V_{tx\ min}$ is greater than the second predetermined voltage, controller 6 illuminates fuel "bars" 32, 34, and 36. If, however, the value of $V_{tx\ min}$ is between the first predetermined voltage and the second predetermined voltage, controller 6 illuminates fuel "bars" 32 and 34 and extinguishes fuel "bar" 36. Lastly, if the value of $V_{tx\ min}$ is less than the first predetermined voltage, controller 6 illuminates fuel "bar" 32 and extinguishes fuel "bars" 34 and 36.

Display 16 can also include another visual indicator and memory 10 can include another predetermined voltage for comparison with $V_{tx\ min}$. This other predetermined voltage can be selected to correspond to a few minutes of operating power remaining in battery 26. When the value of $V_{tx\ min}$ in decreases below the value of this other predetermined voltage, the other visual indicator can be illuminated (such as flashing on and off fuel bar 32) to indicate that only a few minutes of operating power remain in battery 26.

In the TDMA mode of operation, the value of $V_{in\text{-}slot}$ is determined when the radio is drawing power from battery 26 during in-slot transmission. However, in the GSM mode of operation, radio 28 adjusts its transmit power based upon a strength of a signal received by radio 28. Thus, if radio 28 receives a signal having a strong signal strength, an assumption is made that radio 28 is close to the source of the signal and radio 28 reduces its in-slot transmit power accordingly. In contrast, if the strength of the signal received by radio 28 is relatively weak, an assumption is made that radio 28 is further away from the source of the signal and radio 28 increases its transmit power accordingly. Because of the possible wide variation in the value of $V_{in\text{-}slot}$ caused by changing the transmit power of radio 28 during in-slot transmission. The comparison of $V_{tx\ min}$ to a set of loaded threshold values are in accurate because the loaded threshold values assume full power while $V_{tx\ min}$ could be in varying states of cutback. However, an accurate measure of $V_{std\text{-}by}$ can be made. This $V_{std\text{-}by}$ measurement can be compared against a set of unloaded threshold values which can now be used to more accurately estimate the power remaining in the battery 26 of radio 28 operating in a GSM mode of operation. A method of estimating the power remaining in battery 26 of radio 28 operating in a GSM mode of operation is shown in the flow chart of FIG. 2. In the method, a stand-by voltage shift ($\Delta sb$) is empirically determined in step 100 for the difference between $V_{std\text{-}by}$ and $V_{out\text{-}slot}$ and in step 102, a compensation factor (K2) is empirically determined. In step 104, the values of $\Delta sb$ and K2 are programmed into memory 10 of radio 28. In step 106, controller 6 measures from battery 26 via A/D converter 24, a value of $V_{in\text{-}slot}$ immediately after radio 28 enters the out-of-slot transmission mode after terminating the in-slot transmission mode. Next, in step 108, controller 6 measures from battery 26 via A/D converter 24, a value of $V_{out\text{-}slot}$ after a delay interval. The duration of the delay interval is selected to permit time for the voltage of battery 26 to recover to a steady state value of $V_{out\text{-}slot}$ after exiting the in-slot transmission mode and entering the out-of-slot transmission mode. In step 110, controller 6 determines a value of $V_{std\text{-}by}$ by as a function of the combination of the values of $V_{in\text{-}slot}$, $V_{out\text{-}slot}$, $\Delta sb$, and K2. In step 112, controller 6 compares the value of $V_{std\text{-}by}$ to one or more predetermined voltages to estimate the remaining power in battery 26 of radio R. In response to the comparison in step 112, controller 6, in step 114, selectively illuminates fuel "bars" 32, 34, and/or 36.

More specifically, when radio 28 is in the GSM mode of operation, controller 6 adds $\Delta sb$ to the measured value of $V_{out\text{-}slot}$ to obtain an estimate of $V_{std\text{-}by}$. However, in the GSM mode of operation, an additional voltage shift issue was discovered that was determined to be related to the in-slot transmission power of radio 28. In essence, the higher the in-slot transmission power, the larger the difference between $V_{out\text{-}slot}$ and $V_{std\text{-}by}$. It has been determined that compensation factor K2 was needed to alleviate for this further voltage shift. The value of compensation factor K2 was empirically determined to be approximate one-eighth of the difference between $V_{out\text{-}slot}$ and $V_{in\text{-}slot}$. Thus, the value of $V_{std\text{-}by}$ in the GSM mode of operation of radio 28 is determined as follows:

$$V_{std\text{-}by}=(V_{out\text{-}slot})+(\Delta sb)+[(V_{out\text{-}slot})-(V_{in\text{-}slot})]*K2 \qquad \text{EQ. 4}$$

In the manner described above in connection with the TDMA mode of operation, the value of $V_{std\text{-}by}$ determined using EQ. 4 is compared to a set of predetermined unloaded voltage values stored in memory 10 to determine the useful power remaining in battery 26 of radio 28 operating in the GSM mode of operation. Based on the results of this comparison, fuel "bars" 32, 34, and 36 are selectively illuminated on display 16.

Utilizing EQ. 3 in the TDMA mode of operation or EQ. 4 in the GSM mode of operation enables radio 28 to more accurately determine the useful power remaining in battery 26. In addition, utilizing EQ. 3 or EQ. 4 in the TDMA or GSM modes of operation to determine the power remaining in battery 26, provides more stable illumination of fuel "bars" 32, 34, or 36 during transmission, and avoids inadvertent fluctuation of fuel "bars" 32, 34, or 36 attendant with prior art methods of determining the useful power remaining in battery 26.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of estimating the power remaining in a battery of a radio, the method comprising the steps of:

measuring an in-slot transmit battery voltage ($V_{in\text{-}slot}$);

measuring an out-of-slot transmit battery voltage ($V_{out\text{-}slot}$);

determining empirically a stand-by compensation factor ($\Delta sb$);

determining empirically a compensation factor (K);

estimating as a function of the combination of $V_{in\text{-}slot}$, $V_{out\text{-}slot}$, $\Delta sb$, and compensation factor K, a voltage of the battery related to the stand-by battery voltage ($V_{std\text{-}by}$);

comparing the estimated voltage to one or more predetermined voltage values to estimate the power remaining in the battery and;

wherein the radio determines the $V_{std\text{-}by}$ utilizing the formula:

$$V_{std\text{-}by}=(V_{out\text{-}slot})+(\Delta sb)+[(V_{out\text{-}slot})-(V_{in\text{-}slot})]*K,$$

where K is less than 1.

2. The method of claim 1, wherein K substantially equals 0.125.

* * * * *